United States Patent
Kim et al.

(10) Patent No.: US 9,503,235 B2
(45) Date of Patent: Nov. 22, 2016

(54) METHOD AND APPARATUS FOR TRANSMITTING CHANNEL STATE INFORMATION-REFERENCE SIGNALS IN WIRELESS COMMUNICATION SYSTEM

(71) Applicant: LG ELECTRONICS INC., Seoul (KR)

(72) Inventors: Kijun Kim, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/424,893

(22) PCT Filed: Sep. 11, 2013

(86) PCT No.: PCT/KR2013/008209
§ 371 (c)(1),
(2) Date: Feb. 27, 2015

(87) PCT Pub. No.: WO2014/042422
PCT Pub. Date: Mar. 20, 2014

(65) Prior Publication Data
US 2015/0244508 A1    Aug. 27, 2015

Related U.S. Application Data

(60) Provisional application No. 61/699,789, filed on Sep. 11, 2012.

(51) Int. Cl.
*H04W 80/04* (2009.01)
*H04W 88/06* (2009.01)
(Continued)

(52) U.S. Cl.
CPC ............. *H04L 5/0048* (2013.01); *H04B 7/068* (2013.01); *H04B 7/0684* (2013.01); *H04L 5/0023* (2013.01); *H04L 5/0082* (2013.01); *H04L 27/2601* (2013.01); *H04L 5/0057* (2013.01)

(58) Field of Classification Search
CPC ... H04W 80/04; H04W 88/06; H04W 28/04; H04W 72/04
USPC ................................................. 370/328, 329
See application file for complete search history.

(56) References Cited

U.S. PATENT DOCUMENTS

2012/0188955 A1    7/2012    Zhang
2015/0289234 A1*   10/2015   Zhao .................... H04L 1/1861
                                                            370/329

FOREIGN PATENT DOCUMENTS

CN    WO 2012062178    *  5/2012    ............... H04B 7/26
KR    10-2011-0132180     12/2011
(Continued)

OTHER PUBLICATIONS

PCT International Application No. PCT/KR2013/008209, Written Opinion of the International Searching Authority dated Dec. 31, 2013, 9 pages.
(Continued)

*Primary Examiner* — Ronald B Abelson
(74) *Attorney, Agent, or Firm* — Lee Hong Degerman Kang Waimey

(57) ABSTRACT

A method of transmitting channel state information (CSI)-reference signals (RS) at a base station in a wireless communication system includes generating a reference signal sequence, and mapping the reference signal sequence to resource elements (REs) included in one or more patterns for 8-port CSI-RS transmission among five patterns for 8-port CSI-RS transmission located in a first region of a PRB pair and three patterns for 8-port CSI-RS transmission located in a second region of the PRB pair. A maximum of two OFDM (orthogonal frequency division multiplexing) symbols is used for a physical downlink control channel in a subframe including the PRB pair.

11 Claims, 9 Drawing Sheets

(51) Int. Cl.
    *H04W 28/04* (2009.01)
    *H04W 72/04* (2009.01)
    *H04L 5/00* (2006.01)
    *H04B 7/06* (2006.01)
    *H04L 27/26* (2006.01)

(56) References Cited

FOREIGN PATENT DOCUMENTS

| WO | 2011/153264 | 12/2011 |
|---|---|---|
| WO | 2011/153286 | 12/2011 |
| WO | 2012/111937 | 8/2012 |

OTHER PUBLICATIONS

European Patent Office Application No. 13837686.8, Search Report dated May 3, 2016, 9 pages.

Huawei, "Email discussion summary of CSI-RS design", R1-103100, 3GPP TSG RAN WG1 meeting #61, May 2010, 16 pages.

Catt, "Details on R-PDCCH interleaving in LTE-A", R1-104339, 3GPP TSG RAN WG1 meeting #62, Aug. 2010, 6 pages.

* cited by examiner (a)

(b)

METHOD AND APPARATUS FOR TRANSMITTING CHANNEL STATE INFORMATION-REFERENCE SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2013/008209, filed on Sep. 11, 2013, which claims the benefit of U.S. Provisional Application Ser. No. 61/699,789, filed on Sep. 11, 2012, the contents of which are all hereby incorporated by reference herein in their entirety.

TECHNICAL FIELD

The following description relates to a wireless communication system and, more particularly, to a method and apparatus for transmitting channel state information (CSI)-reference signals (RSs).

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi Carrier Frequency Division Multiple Access (MC-FDMA), etc.

DISCLOSURE

Technical Problem

An object of the present invention devised to solve the problem lies in a technologies related to transmission of more than 8 channel state information (CSI)-reference signals (RSs).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method of transmitting channel state information (CSI)-reference signals (RSs) at a base station in a wireless communication system, including generating a reference signal sequence, and mapping the reference signal sequence to resource elements (REs) included in one or more patterns for 8-port CSI-RS transmission among five patterns for 8-port CSI-RS transmission located in a first region of a PRB pair and three patterns for 8-port CSI-RS transmission located in a second region of the PRB pair, wherein a maximum of two OFDM symbols is used for a physical downlink control channel in a subframe including the PRB pair.

In another aspect of the present invention, provided herein is a base station apparatus for transmitting channel state information (CSI)-reference signals (RSs) in a wireless communication system, including a transmission module and a processor, wherein the processor generates a reference signal sequence, and maps the reference signal sequence to resource elements (REs) included in one or more patterns for 8-port CSI-RS transmission among five patterns for 8-port CSI-RS transmission located in a first region of a PRB pair and three patterns for 8-port CSI-RS transmission located in a second region of the PRB pair, and wherein a maximum of two OFDM symbols is used for a physical downlink control channel in a subframe including the PRB pair.

The aspects of the present invention include some or all of the following features.

The three patterns for 8-port CSI-RS transmission located in the second region of the PRB pair may be used only for 64-port CSI-RS transmission.

The three patterns for 8-port CSI-RS transmission located in the second region may be prohibited from being set as zero-power CSI-RSs.

If the reference signal sequence is for 64-port CSI-RSs, both the five patterns for 8-port CSI-RSs transmission located in the first region and the three patterns for 8-port CSI-RSs transmission located in the second region may be used.

If the reference signal sequence is for 32-port CSI-RSs, all the five patterns for 8-port CSI-RSs transmission located in the first region may be used.

The first region may be included in last two orthogonal frequency division multiplexing (OFDM) symbols of a first slot of the PRB pair and third and fourth OFDM symbols and last two OFDM symbols of a second slot of the PRB pair, and the second region may be included in third and fourth OFDM symbols of the first slot of the PRB pair.

The patterns for 8-port CSI-RS transmission may include a first RE, an RE having an index which is one less than an index of the first RE in a frequency axis direction, an RE having an index which is one greater than an index of the first RE in a time axis direction and an RE having an index which is one less in the frequency axis direction than an index of the RE having the index which is one greater than an index of the first RE in the time axis direction and a second RE, an RE having an index which is one less than an index of the second RE in the frequency axis direction, an RE having an index which is one greater than an index of the second RE in the time axis direction and an RE having an index which is one less in the frequency axis direction than an index of the RE having the index which is one greater than an index of the second RE in the time axis direction, in the PRB pair.

The second RE may be located to be separated from the first RE by 6 subcarriers on a frequency axis.

The first RE included in the first region may be located at (11, 2), (9, 2), (7, 2) and (9, 5) at each slot of the PRB pair and (integer 1, integer 2)=(subcarrier index, OFDM symbol index).

The first RE included in the first region may be located at (11, 2), (9, 2) and (7, 2) at a first slot of the PRB pair and (integer 1, integer 2)=(subcarrier index, OFDM symbol index).

The reference signal sequence may be for one of 16-port, 32-port or 64-port CSI-RSs.

Information about the subframe may be transmitted to a user equipment in advance.

Advantageous Effects

According to the present invention, it is possible to support transmission of more than 8 channel state information (CSI)-reference signals (RSs).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
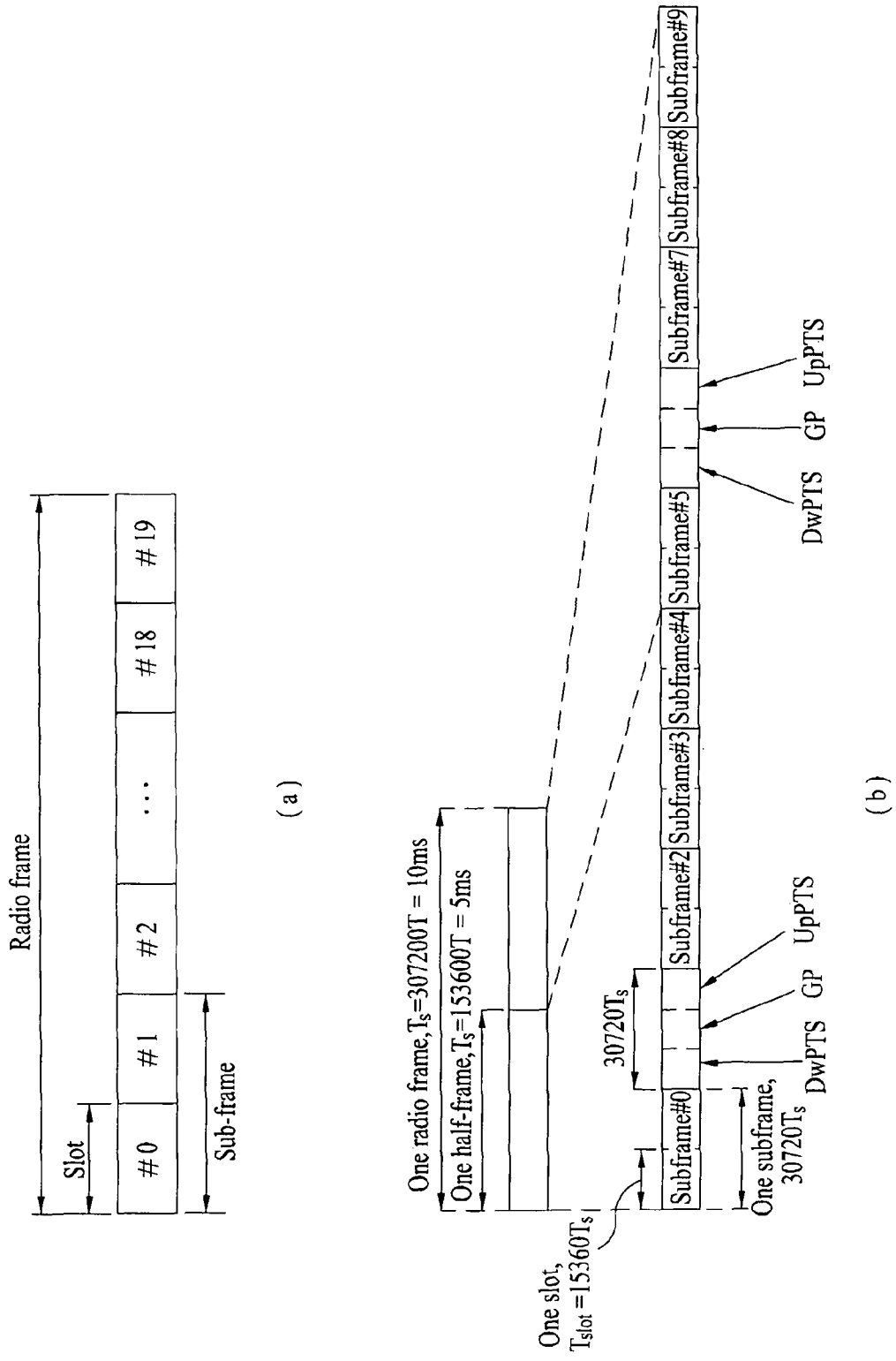
FIG. 1 illustrates the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
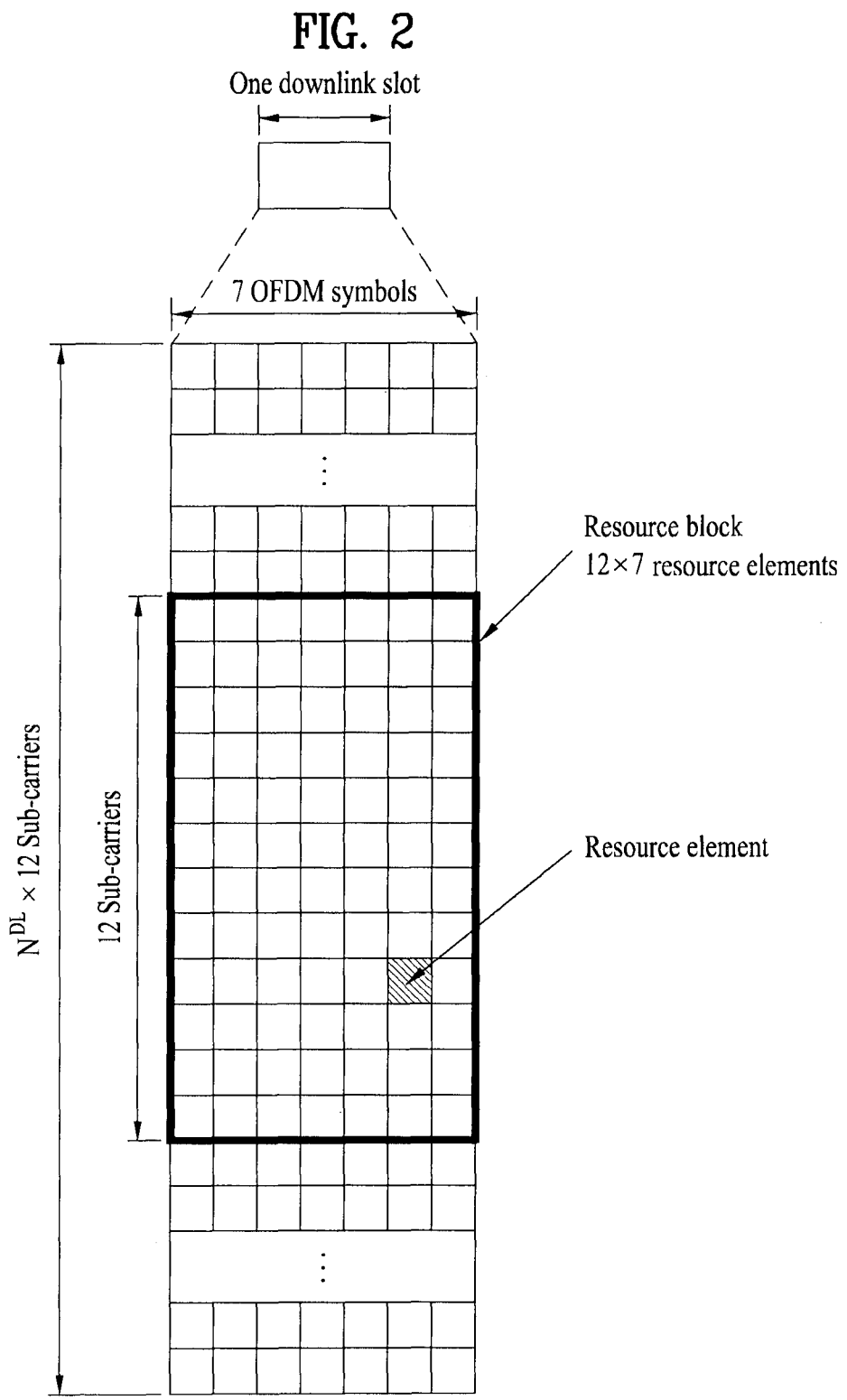
FIG. 2 illustrates the structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
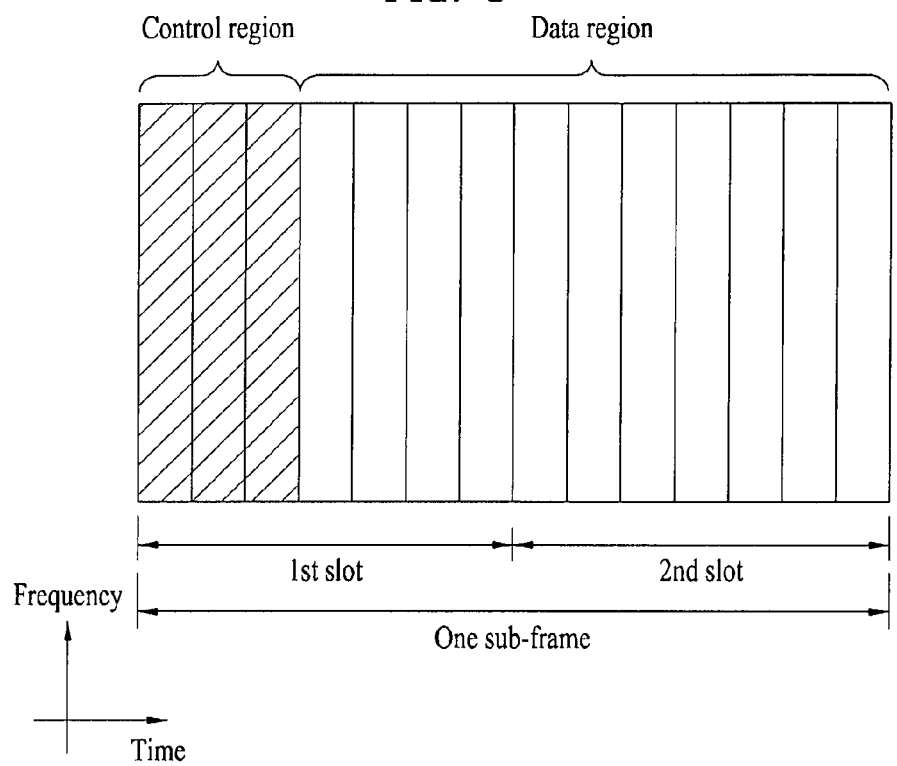
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
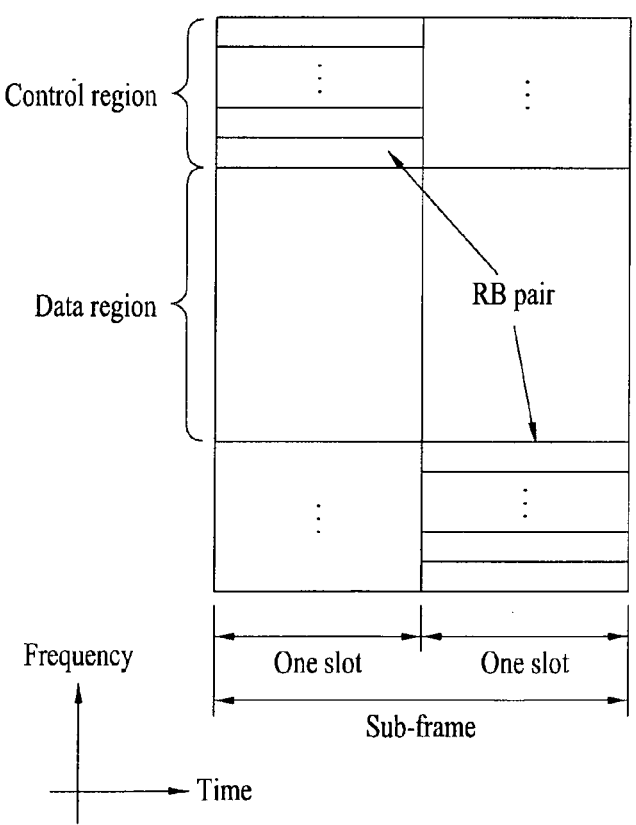
FIG. 4 illustrates the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

Figure 5:
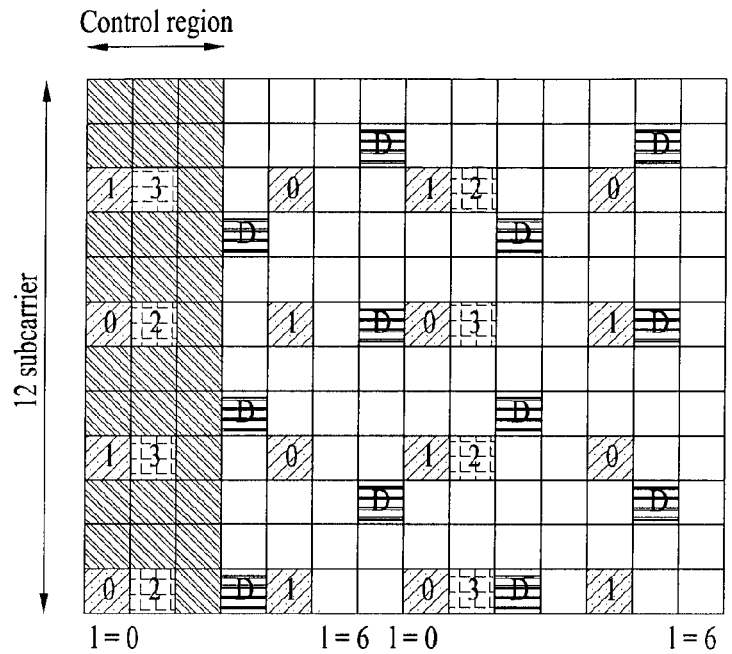
FIG. 5 is a view referred to for describing Reference Signals (RSs)
Figure 5:
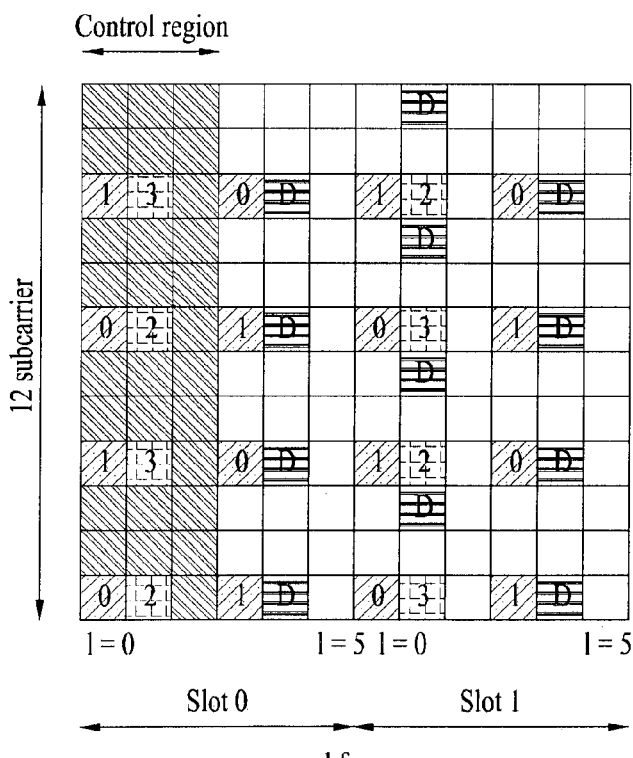

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

CSI-RS

CSI-RS is an RS used for channel measurement in an LTE-A system supporting up to eight antenna ports on downlink. CSI-RS differs in this aspect from CRS used for both channel measurement and data demodulation and thus it is not necessary to transmit CSI-RSs in every subframe like CRSs. CSI-RS is used in Transmission Mode 9 . For data demodulation, DM-RS is used.

More specifically, CSI-RSs may be transmitted through 1, 2, 4 or 8 antenna ports. Antenna 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following [Equation 1].

$$r_{l,n_s}(m) = \frac{1}{\sqrt{2}}(1 - 2 \cdot c(2m)) + j\frac{1}{\sqrt{2}}(1 - 2 \cdot c(2m + 1)),$$ [Equation 1]

$$m = 0, 1, \ldots, N_{RB}^{max,DL} - 1$$

Where $r_{l,n_s}(m)$ denotes the generated CSI-RSs, $c(i)$ denotes a pseudo-random sequence, $n_s$ is a slot number, l is an OFDM symbol index, and $N_{RB}^{max, DL}$ denotes the maximum number of RBs in a downlink bandwidth.

The CSI-RSs generated by [Equation 1] may be mapped to REs on a per-antenna port basis by the following equation.

$$a_{k,l}^{(p)} = w_{l''} \cdot r_{l,n_s}(m')$$ [Equation 2]

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

TABLE 1

| CSI RS Configuration | Number of CSI RSs configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Figures 6, 7:
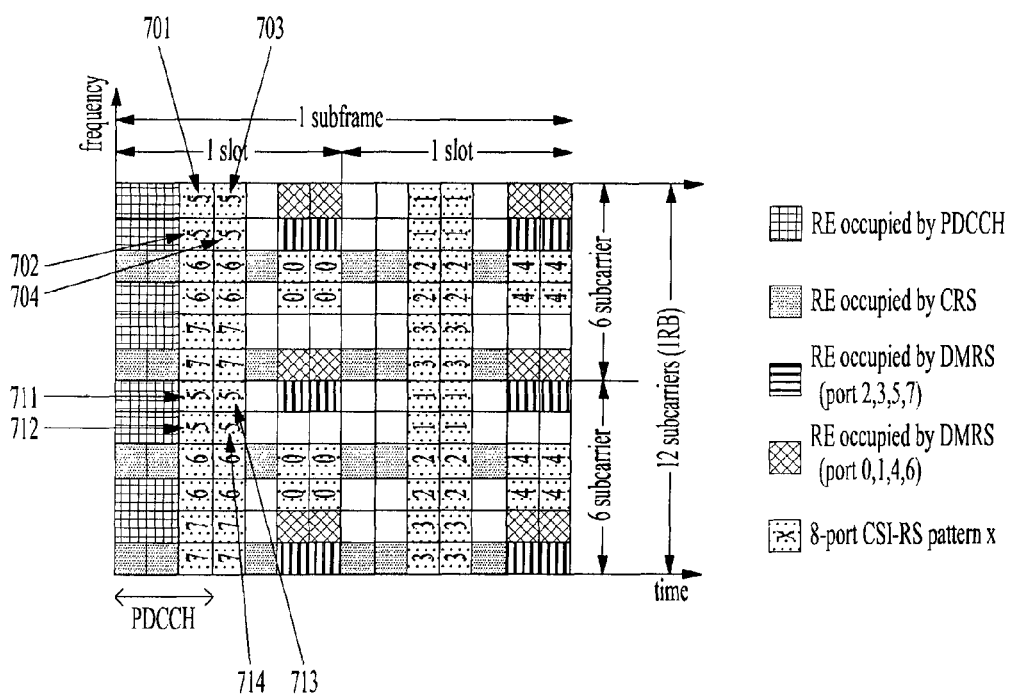
FIG. 6 is a diagram illustrating a channel state information (CSI)-reference signal (RS)
FIGS. 7 to 10 are diagrams illustrating embodiments of the present invention.

By Equation 2 and Table 1, CSI-RSs are mapped to REs as shown in FIG. 6. In FIG. 6, numeral denotes a CSI-RS two REs, which are consecutive in a time axis direction, among equally hatched REs. In case of 4-port CSI-RS, REs used for CSI-RS transmission are REs corresponding to four consecutive numerals from equally hatched $0^{th}$ and $4^{th}$ REs. In case of 8-port CSI-RS, a reference signal sequence is mapped to equally hatched REs.

As described above, the CSI-RSs may not be transmitted in every subframe but may be transmitted in a specific subframe. More specifically, the CSI-RSs may be transmitted in a subframe satisfying Equation 3 below by referring to a CSI-RS subframe configuration shown in Table 2.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

$$(10n_f + \lfloor n_s/2 \rfloor - \Delta_{CSI-RS}) \mod T_{CSI-RS} = 0 \quad \text{[Equation 3]}$$

where $T_{CSI-RS}$ denotes the transmission period of CSI-RSs, $\Delta_{CSI-RS}$ is an offset, $n_f$ is a system frame number, and $n_s$ is a slot number.

These CSI-RSs may be signaled to a UE in a CSI-RS config Information Element (IE) described in [Table 3] below.

TABLE 3

```
CSI-RS-Config-r10::=           SEQUENCE {
        csi-RS-r10                     CHOICE {
            release                        NULL,
            setup                          SEQUENCE {
                antennaPortsCount-r10          ENUMERATED {an1, an2, an4, an8},
                resourceConfig-r10             INTEGER (0..31),
                subframeConfig-r10             INTEGER (0..154),
                p-C-r10                        INTEGER (-8.. 15)
            }
        }                                              OPTIONAL,    -- Need
    ON
        zeroTxPowerCSI-RS-r10          CHOICE {
            release                        NULL,
            setup                          SEQUENCE {
                zeroTxPowerResourceConfigList-r10 BIT STRING (SIZE (16)),
                zeroTxPowerSubframeConfig-r10 INTEGER (0..154)
            }
        }                                              OPTIONAL    -- Need
    ON
}
``` port and an actual port number may be obtained by adding 15 to this numeral. More specifically, referring to FIG. 6, a reference signal for one CSI-RS port is spread over two consecutive OFDM symbols and two CSI-RSs share two REs distinguished using an orthogonal sequence. For example, REs denoted by numerals 0 and 1 mean two REs in which CSI-RS ports 0 and 1 are transmitted.

In FIG. 6, if the number of CSI-RSs is 2, that is, in case of 2-port CSI-RS, the REs used for CSI-RS transmission are In [Table 3], 'antennaPortsCount-r10' indicates the number of antennas through which CSI-RSs are transmitted (one of 1, 2, 4 and 8 is selected), and 'resourceConfig-r10' specifies REs carrying the CSI-RSs in one RB in the time-frequency domain. 'subframeConfig-r10' indicates a subframe carrying the CSI-RSs and the ratio of a CSI-RS Energy Per Resource Element (EPRE) to a PDSCH EPRE. In addition, the eNB transmits information about zero-power CSI-RSs.

In the CSI-RS Config IE, 'resourceConfig-r10' indicates the positions of the CSI-RSs. Specifically, 'resourceConfig-r10' indicates the positions of symbols and subcarriers carrying the CSI-RSs in one RB according to a CSI-RS configuration number ranging from 0 to 31 in [Table 1].

As described above, currently, in the LTE-A system, only 8-port CSI-RS transmission is supported. In consideration of 3D MIMO, massive MIMO, etc., 16-port, 32-port or 64-port CSI-RS transmission needs to be supported. Accordingly, a CSI-RS transmission structure will now be described.

Embodiment 1

Embodiment 1 relates to a method of transmitting CSI-RSs of more than 8 ports using REs for CSI-RSs defined in existing LTE-A system and additional REs in a single subframe. Hereinafter, for convenience of description, a region including REs for CSI-RSs in existing LTE-A system is referred to as a first region and a region including REs newly defined in order to transmit CSI-RSs of more than 8 ports is referred to as a second region. As shown in FIG. 6, the first region includes 5 patterns for 8-port CSI-RS transmission and the second region includes three patterns for 8-port CSI-RS transmission. That is, CSI-RS transmission of more than 8 ports may use one or more patterns among five patterns for 8-port CSI-RS transmission of the first region and three patterns for 8-port CSI-RS transmission of the second region.

The position of the second region is shown in FIG. 7, for example. In FIG. 7, the same numeral denotes REs configuring one 8-port CSI-RS. In other words, numeral x denotes an 8-port CSI-RS pattern x. In FIG. 7, 8-port CSI-RS patterns 0, 1, 2, 3 and 4 are REs defined in existing LTE-A system and correspond to the first region and 8-port CSI-RS patterns 5, 6 and 7 correspond to the second region. That is, in the example of FIG. 7, the second region is included in third and fourth OFDM symbols of a first slot. The present invention is not limited to the example of FIG. 7 and the second region may be included in OFDM symbols other than OFDM symbols in which the first region is included.

As shown in FIG. 7, if the second region, that is, the three patterns for additional 8-port CSI-RS transmission, is defined, 16-, 32-, 64-port CSI-RS transmission may be performed as follows. All 64-port CSI-RSs may be transmitted in one subframe using all 8 patterns, that is, 8-port CSI-RS patterns 0 to 7. 32-port CSI-RSs may be transmitted using 8-port CSI-RS patterns 1, 2, 3 and 4 or 8-port CSI-RS patterns 5, 6, 7 and 0. 16-port CSI-RSs may be transmitted using 8-port CSI-RS patterns 1 and 2, 8-port CSI-RS patterns 3 and 4, 8-port CSI-RS patterns 5 and 6 or 8-port CSI-RS patterns 7 and 0. For such CSI-RS transmission, a PDCCH may be transmitted only using a maximum of two OFDM symbols. Accordingly, information about the subframe using only a maximum of two OFDM symbols (disregarding a PCFICH) may be transmitted to the UE in advance. Alternatively, the eNB may inform the UE that the 8-port CSI-RS patterns of the second region is used and the UE which receives this information may determine that the PDCCH is transmitted only in a maximum of two OFDM symbols in the corresponding subframe.

As another example, three patterns for 8-port CSI-RS transmission located in the second region may be defined to be used only for 64-port CSI-RS transmission. In this case, 64-port CSI-RSs may be transmitted using all 8 patterns, that is, 8-port CSI-RS patterns 0 to 7. 32-port CSI-RSs may be transmitted using 8-port CSI-RS patterns 1, 2, 3 and 4. 16-port CSI-RSs may be transmitted using 8-port CSI-RS patterns 1 and 2 or 8-port CSI-RS patterns 3 and 4. In addition, 8-port CSI-RS patterns 5, 6 and 7 of the second region may be prohibited from being set as zero-power CSI-RSs. Preferably, CSI is fed back to a UE located at a cell center using all 64-port CSI-RSs and is fed back to a UE located at a cell edge using CSI-RSs of less than 64 ports in terms of feedback overhead and performance improvement. Since interference of a neighboring cell is not large with respect to the UE located at the cell center, a possibility that 8-port CSI-RS patterns 5, 6 and 7 are set as zero-power CSI-RSs does not need to be applied to peripheral transmission points.

The positions of the three patterns for 8-port CSI-RS transmission located in the second region shown in FIG. 7 will now be described. First, REs corresponding to patterns for 8-port CSI-RS transmission include a first RE 701, an RE 702 having an index which is one less than an index of the first RE in a frequency axis direction, an RE 703 having an index which is one greater than an index of the first RE in a time axis direction, an RE 704 having an index which is one less in the frequency axis direction than an index of the RE 703 having the index which is one greater than an index of the first RE in the time axis direction, a second RE 711, an RE 712 having an index which is one less than an index of the second RE in the frequency axis direction, an RE 713 having an index which is one greater than an index of the second RE in the time axis direction, an RE 714 having an index which is one less in the frequency axis direction than an index of the RE 713 having the index which is one greater than an index of the second RE in the time axis direction. The second RE may be separated from the first RE by 6 subcarriers on the frequency axis. In this case, the first RE included in the second region is located at (11, 2), (9, 2) and (7, 2) in a first slot of the PRB pair. Here, (integer 1, integer 2)=(subcarrier index, OFDM symbol index). Similarly, the first RE included in the first region is located at (11, 2), (9, 2), (7, 2) and (9, 5) in each slot of the PRB pair.

Figure 8:
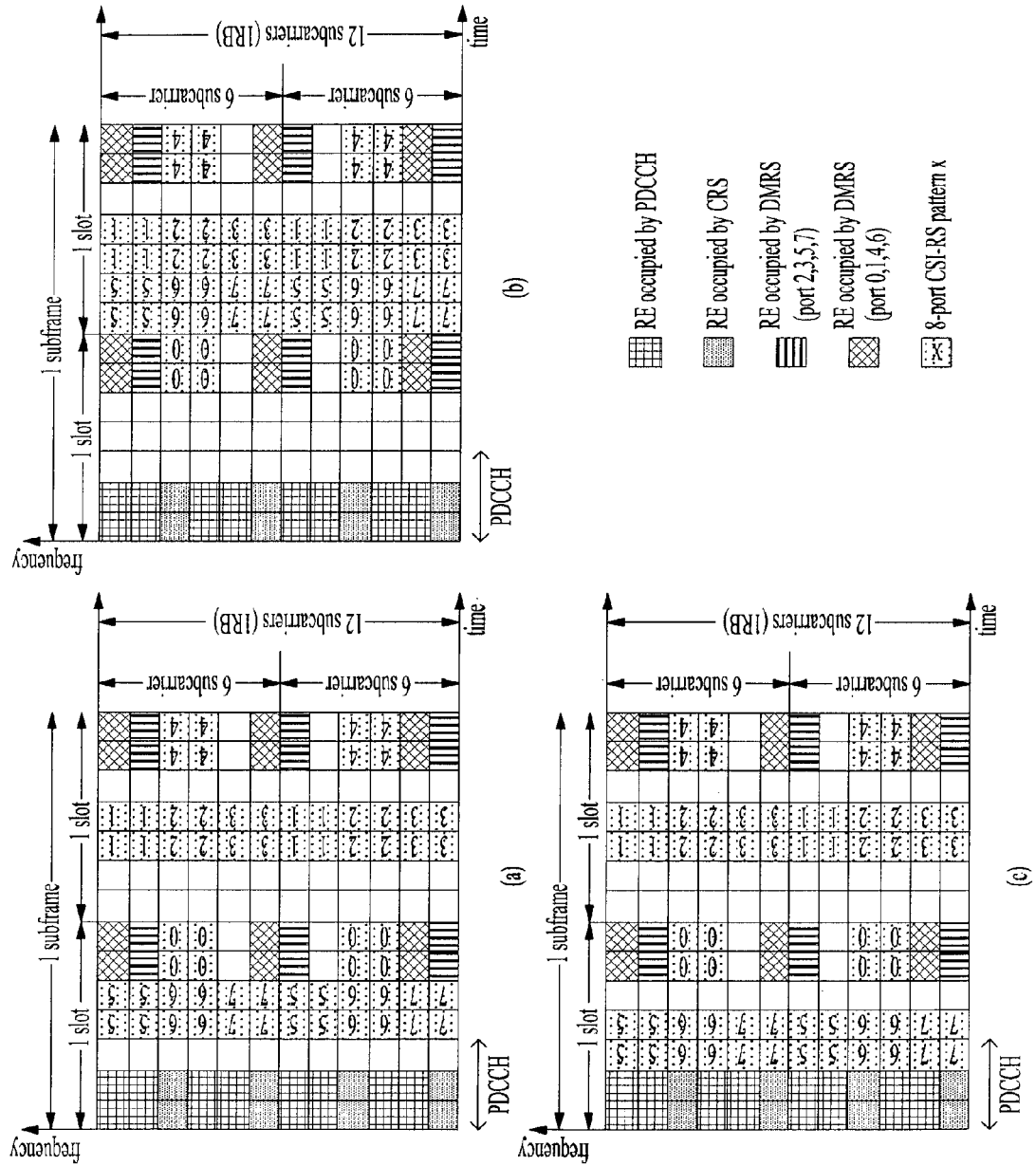

FIG. 8 shows embodiments of an MBSFN subframe supporting PDSCH transmission in the normal CP case. FIG. 8(a) shows the case that the second region is located at fourth and fifth OFDM symbols of the first slot, FIG. 8(b) shows the case that the second region is located at first and second OFDM symbols of the second slot and FIG. 8(c) shows the case that the second region is located at third and fourth OFDM symbols of the first slot. In FIG. 8, descriptions except for the position of the second region and the PDCCH, refer to FIG. 7.

Embodiment 2

Figure 9:
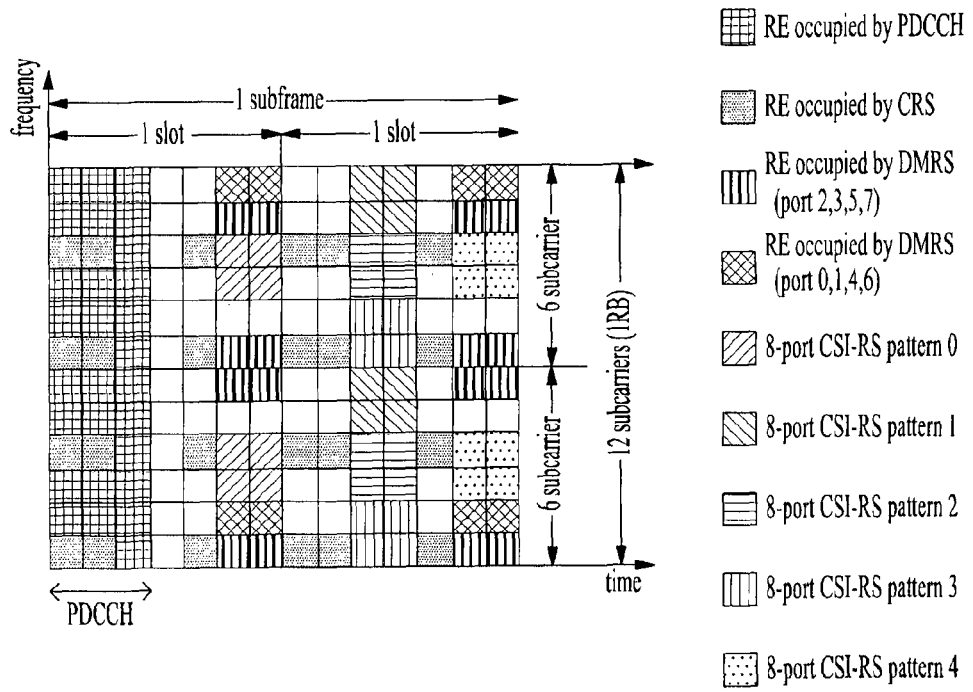

Embodiment 2 relates to a method of transmitting N-port CSI-RSs using only patterns for 8-port CSI-RSs included in the first region. In this case, since additional REs defined for CSI-RSs are not present, only CSI-RS transmission on a maximum of 32 ports is possible. FIG. 9 shows five patterns (8-port CSI-RS patterns 0 to 4) for 8-port CSI-RS transmission of the first region.

If 16-port CSI-RSs are transmitted according to Embodiment 2, two of the five patterns for 8-port CSI-RS transmission may be selected. In general, in case of 8*M, in order to specify REs used for 8*M-port CSI-RS transmission, M existing 8-port CSI-RS patterns located in the same subframe are specified. That is, for 8*M-port CSI-RS transmission, the UE is informed of M 8-port CSI-RS transmission resources.

As a method of selecting M 8-port CSI-RS transmission patterns from among five 8-port CSI-RS transmission patterns, $_5C_M$ may be used. Only patterns satisfying a specific condition may be pre-specified to be used for 8*M-port CSI-RS transmission and one pattern may be selected from among such patterns and indicated to the UE. Here, the specific condition means that OFDM symbols transmitted on all antenna ports of 8*M-port CSI-RSs should be transmitted only in a predetermined number of consecutive OFDM symbols. That is, if 16-port CSI-RSs should be transmitted in two consecutive OFDM symbols, only a method of transmitting 16-port CSI-RSs using two of 8-port CSI-RS transmission patterns 1, 2 and 3 may be used. Alternatively, a method of supporting 8*M-port CSI-RS transmission using only resources of consecutive indices of the 8-port CSI-RS transmission patterns may be used. Alternatively, for 16-port CSI-RS transmission, only a method of allocating 8-port CSI-RS transmission patterns 0 and 1 and a method allocating 8-port CSI-RS transmission patterns 2 and 3 are considered and, for 16-port CSI-RS transmission, only a method of allocating 8-port CSI-RS transmission patterns 0, 1, 2 and 3 may be used.

Embodiment 3

Figure 10:
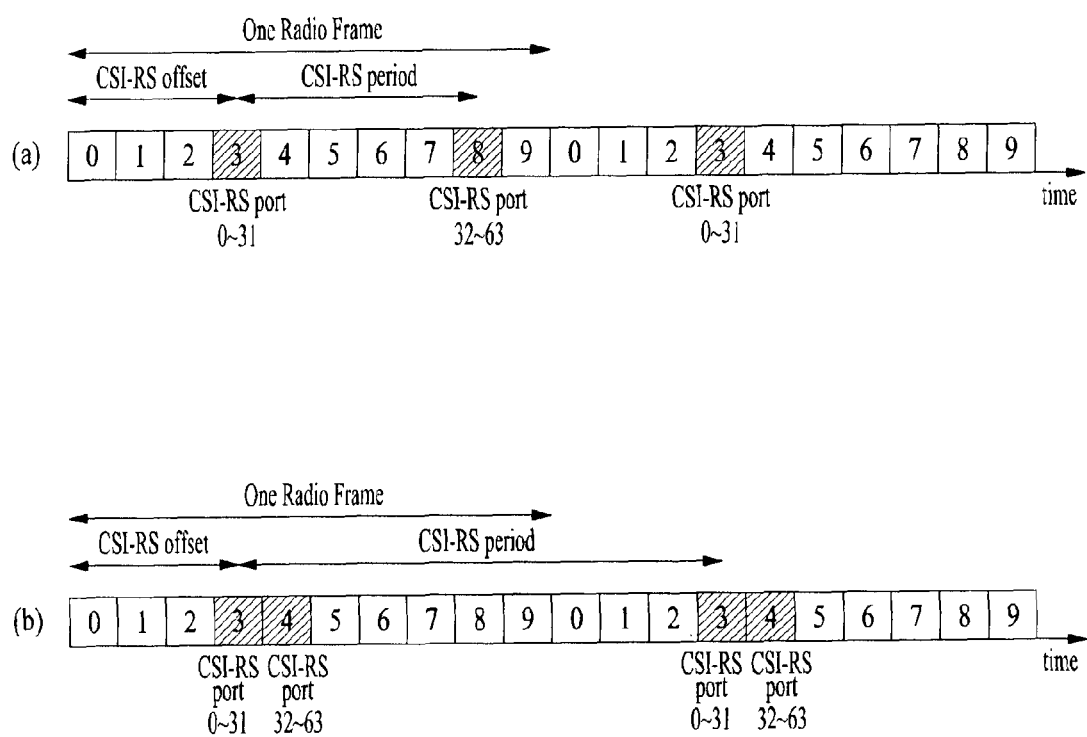

Embodiment 3 relates to transmission of N-port CSI-RSs using only REs of the first region and one or more subframes. More specifically, N-port CSI-RSs are transmitted in k subframes in a state of dividing antenna ports, and a CSI-RS transmission period may be a period of a subframe in which CSI-RSs of a single CSI-RS resource is transmitted without distinction of antenna port index (that is, a periodicity ($T_{CSI-RS}$) 5, 10, 20, 40 or 80 of a subframe, in which the CSI-RS is transmitted, of Table 2). For example, if the CSI-RS transmission periodicity is T and 64-port CSI-RSs are transmitted in two subframes in a state of being divided by 32 ports, CSI-RS ports 0 to 31 may be transmitted in an n-th subframe and CSI-RS ports 32 to 64 may be transmitted in an (n+T)-th subframe. FIG. 10(*a*) shows the case in which T is 5 and a subframe offset is 3.

As another method, N-port CSI-RSs may be divisionally transmitted in K consecutive subframes. In this case, the subframe periodicity $T_{CSI-RS}$ of Table 2 may be interpreted as a periodicity with which a specific CSI-RS port (e.g., CSI-RS port 0) is transmitted. In this method, if the periodicity $T_{CSI-RS}$ of a subframe in which the CSI-RSs are transmitted is T and 64-port CSI-RSs are transmitted in two subframes in a state of being divided by 32 ports, CSI-RS ports 0 to 31 are transmitted in an n-th subframe, an (n+T)-th subframe, an (n+2T)-th subframe, . . . and CSI-RS ports 32 to 63 are transmitted in an (n+1)-th subframe, an (n+1+T)-th subframe, an (n+1+2T)-th subframe, . . . . FIG. 10(*b*) shows the case in which the transmission periodicity is 10 subframes and a subframe offset is 3.

Preferably, RSs corresponding to ports of N-port CSI-RSs are simultaneously transmitted for channel measurement. This is because the receiver determines that the phase of the received signal has been changed if a predetermined time has elapsed although the phase of the channel is not changed due to a difference between a transmission frequency generated at an oscillator of a transmitter and a frequency generated at an oscillator of a receiver. That is, if the transmission frequency is $\omega_0$ and the frequency of the receiver is $\omega_0+\Delta$ due to errors, the phase of the received signal is changed by $\exp(j2\pi\Delta t)$ with time. Therefore, if the 64-port CSI-RSs are divided by 32 ports and are transmitted over two subframes separated by T, the phase is changed by $\exp(j2\pi\Delta t)$ between a first group including CSI-RS ports 0 to 31 and a second group including CSI-RS ports 32 to 63. Such phase change is considered when determining an optimal 64-port PMI for CSI feedback.

Accordingly, if N-port CSI-RSs are divisionally transmitted in a plurality of subframes, the UE may assume that the channel is not changed between subframes for transmitting some ports. That is, the UE measures the channel using the CRS in the subframe in which the CSI-RSs of two groups are transmitted, determines that change in measured value is generated by transmission frequency errors, and performs inverse compensation therefor. More specifically, if a channel estimate measured from the CRS in the subframe in which the first group including the CSI-RS ports 0 to 31 is transmitted is $\alpha_1$ and a channel estimate measured from the CRS in the subframe in which the second group including the CSI-RS ports 32 to 63 is transmitted is $\alpha_2$, the UE determines that a phase difference of $\arg(\alpha_1/\alpha_2)$ is generated by a difference between transmission and reception oscillators and inversely compensates the phase of $\arg(\alpha_1/\alpha_2)$ with respect to the channel estimate measured via the CSI-RS ports 32 to 63 transmitted in the second group. Then, an optimal PMI of 64 ports is determined along with the channel estimate measured via the CSI-RS ports 0 to 31 transmitted in the first group. For inverse compensation of the phase of the UE, if one CSI-RS is divisionally transmitted in a plurality of subframes, the CRS needs to be necessarily transmitted in the subframes. Alternatively, if one CSI-RS is divisionally transmitted in a plurality of subframes, the subframes may be MBSFN subframes.

Embodiment 4

Embodiment 4 is a combination of Embodiments 1 to 3, in which the REs of the second region described in Embodiment 1 (including examples of FIGS. 7 and 8) and the method of Embodiment 3 (including the example of FIG. 9) are combined to transmit CSI-RSs.

Embodiment 5

In Embodiment 5, the second region is defined to include REs for existing DMRS transmission. That is, positions of the 40 REs for existing CSI-RS transmission and the positions of the 24 REs for existing DMRS transmission are combined to transmit 64-port CSI-RSs using all 64 REs.

Embodiment 6

In Embodiment 6, a special subframe for transmission of only CSI-RSs is defined. In this case, the length of the PDCCH is restricted to a maximum of 2 OFDM symbols and 144 REs are used for only CSI-RS transmission at 12 OFDM symbols from a third OFDM symbol to a last OFDM symbol. The 144 REs may be composed of a plurality of non-zero-power CSI-RSs and a zero-power CSI-RS resources.

Apparatus Configuration of Embodiment of the Present Invention

Figure 11:
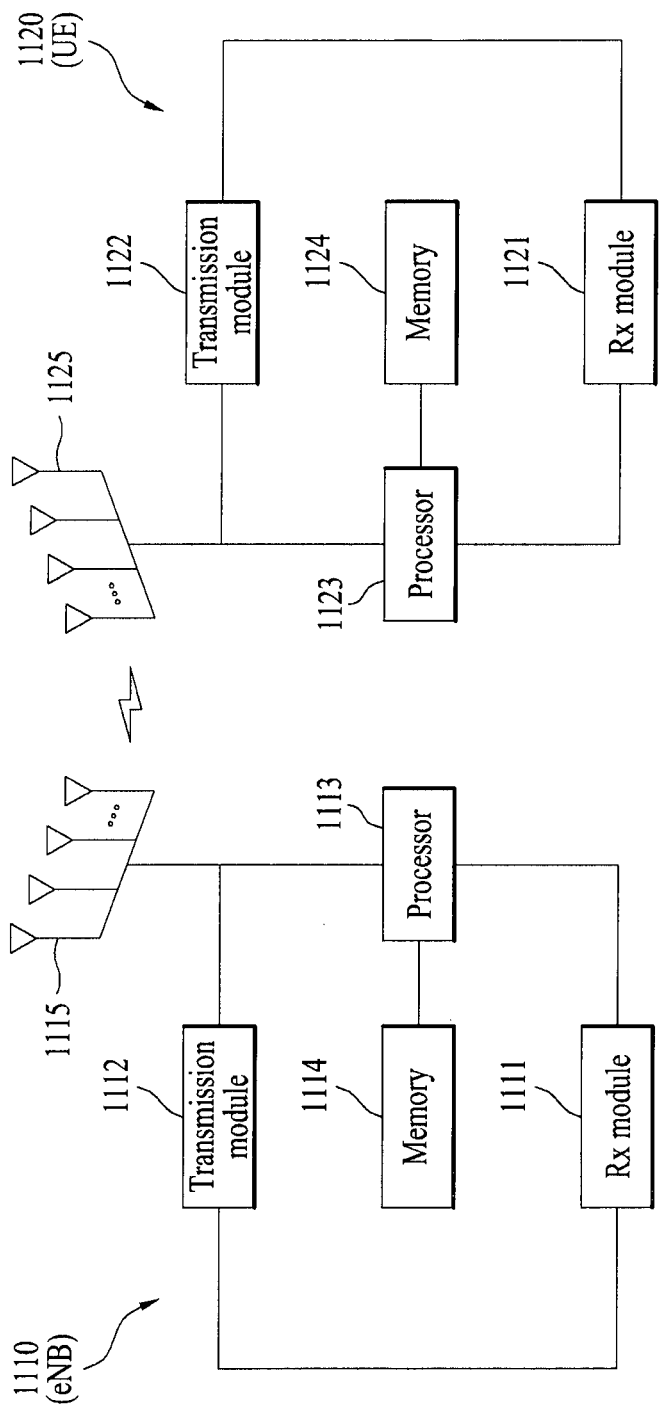
FIG. 11 is a diagram showing the configuration of a transmission/reception apparatus.

FIG. 11 is a block diagram of a transmission point and a UE according to an embodiment of the present invention.

Referring to FIG. 11, a transmission point 1110 according to the present invention may include an Rx module 1111, a Tx module 1112, a processor 1113, a memory 1114, and a plurality of antennas 1115. The plurality of antennas 1115 are used to support MIMO transmission and reception. The Rx module 1111 may receive uplink signals, data and information from a UE. The Tx module 1112 may transmit downlink signals, data and information to a UE. The processor 1113 may provide overall control to the operations of the transmission point 1110.

In accordance with an embodiment of the present invention, the processor 1113 may process necessary information in the afore-described measurement report, handover, random access, etc.

Besides, the processor 1113 processes information received by the transmission point 1110 and information to be transmitted from the transmission point 1110. The memory 1114 may store the processed information for a predetermined time and may be replaced with a component such as a buffer (not shown).

A UE 1120 according to the present invention may include an Rx module 1121, a Tx module 1122, a processor 1123, a memory 1124, and a plurality of antennas 1125. The plurality of antennas 1125 are used to support MIMO transmission and reception. The Rx module 1121 may receive downlink signals, data and information from an eNB. The Tx module 1122 may transmit uplink signals, data and information to an eNB. The processor 1123 may provide overall control to the operations of the UE 1120.

In accordance with an embodiment of the present invention, the processor 1123 may process necessary information in the afore-described measurement report, handover, random access, etc.

Besides, the processor 1123 processes information received by the UE 1120 and information to be transmitted from the UE 1120. The memory 1124 may store the processed information for a predetermined time and may be replaced with a component such as a buffer (not shown).

One or more of the above-described embodiments of the present invention may apply to the configurations of the transmission point and the UE, independently or in combination. Redundant descriptions are avoided for clarity.

The description of the transmission point 1110 may apply to a relay as a downlink transmission entity or an uplink reception entity, and the description of the UE 1120 may apply to the relay as a downlink reception entity or an uplink transmission entity in FIG. 11.

[Mode for Invention]

Various embodiments have been described in the best mode for carrying out the invention.

INDUSTRIAL APPLICABILITY

The embodiments of the present invention are applicable to various mobile communication systems.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method of transmitting channel state information (CSI)-reference signals (RSs) at a base station using N (N is a natural number) antenna ports in a wireless communication system, the method comprising:
   generating, by the base station, a reference signal sequence;
   mapping, by the base station, the reference signal sequence to resource elements (REs) included in M patterns among five predefined patterns for an 8-port CSI-RS transmission,
   wherein M is a natural number equal to or greater than 2; and
   transmitting, by the base station, the mapped reference signal,
   wherein N is a natural number equal to M * 8.

2. The method according to claim 1, wherein, if N is equal to 64, the base station further maps the reference signal sequence to REs included in three additional patterns for the 8-port CSI-RS transmission,
   wherein the three additional patterns are not overlapped with the five predefined patterns.

3. The method according to claim 1, wherein, if N is equal to 32, the base station maps the reference signal sequence to REs included in all the five patterns.

4. The method according to claim 2, wherein:
   the five predefined patterns are included in last two OFDM symbols of a first slot of a physical resource block (PRB) pair and third and fourth OFDM symbols and last two OFDM symbols of a second slot of the PRB pair, and
   the three additional patterns are included in third and fourth OFDM symbols of the first slot of the PRB pair.

5. The method according to claim 1, wherein the five predefined patterns include:
   a first RE, an RE having an index which is one less than an index of the first RE in a frequency axis direction, an RE having an index which is one greater than an index of the first RE in a time axis direction and an RE having an index which is one less in the frequency axis direction than an index of the RE having the index which is one greater than an index of the first RE in the time axis direction, and
   a second RE, an RE having an index which is one less than an index of the second RE in the frequency axis direction, an RE having an index which is one greater than an index of the second RE in the time axis direction and an RE having an index which is one less in the frequency axis direction than an index of the RE having the index which is one greater than an index of the second RE in the time axis direction, in a physical resource block (PRB) pair.

6. The method according to claim 5, wherein the second RE is located to be separated from the first RE by 6 subcarriers on a frequency axis.

7. The method according to claim 6, wherein the first RE included in the first region is located at (11, 2), (9, 2), (7, 2) and (9, 5) at each slot of the PRB pair and (integer 1, integer 2)=(subcarrier index, OFDM symbol index).

8. The method according to claim 6, wherein the first RE included in the first region is located at (11, 2), (9, 2) and (7, 2) at a first slot of the PRB pair and (integer 1, integer 2)=(subcarrier index, OFDM symbol index).

9. The method according to claim 1, wherein N is one of 16, 32 or 64.

10. The method according to claim 1, wherein the five predefined patterns comprise:
first REs located in subcarriers #2, #3, #8 and #9 among subcarriers #0 to #11 on OFDM symbols #5 and #6 among OFDM symbols #0 to #13 in a physical resource block (PRB) pair,
second REs located in subcarriers #4, #5, #10 and #11 among subcarriers #0 to #11 on OFDM symbols #9 and #10 among OFDM symbols #0 to #13 in the PRB pair,
third REs located in subcarriers #2, #3, #8 and #9 among subcarriers #0 to #11 on OFDM symbols #9 and #10 among OFDM symbols #0 to #13 in the PRB pair,
fourth REs located in subcarriers #0, #1, #6 and #7 among subcarriers #0 to #11 on OFDM symbols #9 and #10 among OFDM symbols #0 to #13 in the PRB pair, and
fifth REs located in subcarriers #2, #3, #8 and #9 among subcarriers #0 to #11 on OFDM symbols #12 and #13 among OFDM symbols #0 to #13 in the PRB pair.

11. A base station apparatus for transmitting channel state information (CSI)-reference signals (RSs) using N (N is a natural number) antenna ports in a wireless communication system, the base station apparatus comprising:
a transmission module; and
a processor,
wherein the processor is configured to:
generate a reference signal sequence,
map the reference signal sequence to resource elements (REs) included in M patterns among five predefined patterns for 8-port CSI-RS transmission,
wherein M is a natural number equals to or greater than 2, and
transmits the mapped reference signal,
wherein N is a natural number equal to M * 8.

* * * * *